Jan. 18, 1949.  R. C. BRANDON  2,459,410
AZEOTROPIC DISTILLATION OF 2, 3-DIMETHYLBUTADIENE
FROM METHYL PENTADIENE
Filed March 7, 1947
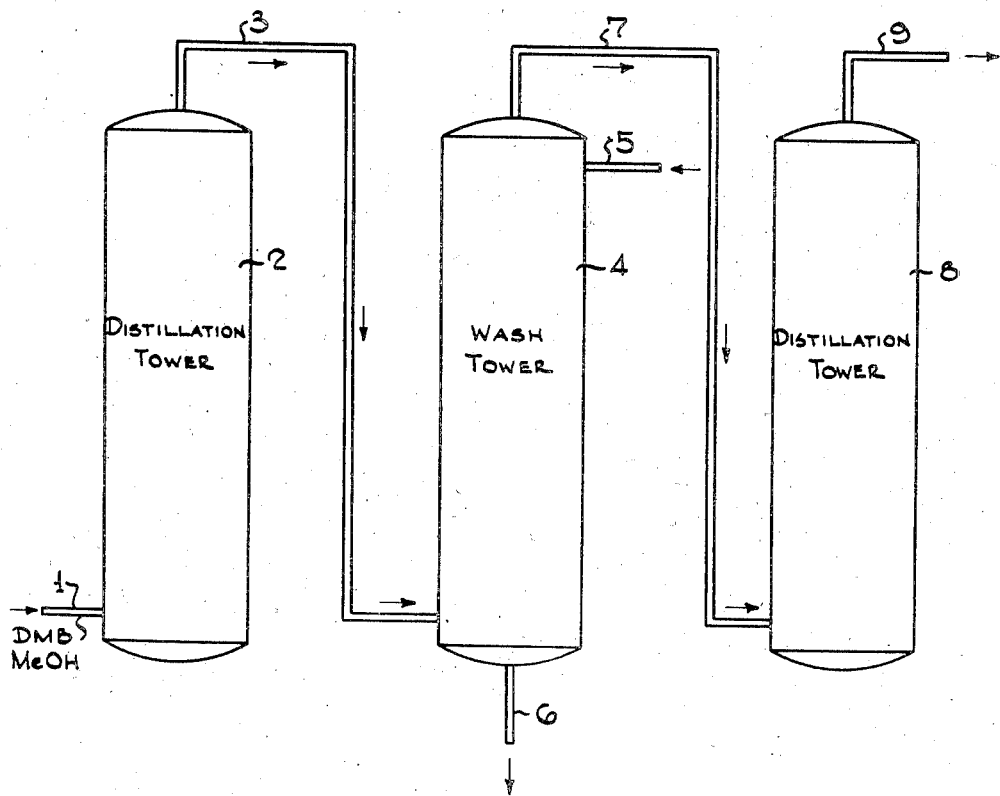
Richard C. Brandon  Inventor
By Henry Berk  Attorney Patented Jan. 18, 1949

2,459,410

UNITED STATES PATENT OFFICE 2,459,410

AZEOTROPIC DISTILLATION OF 2,3-DI-METHYLBUTADIENE FROM METHYL PENTADIENE

Richard C. Brandon, Elizabeth, N. J., assignor to Standard Oil Development Company, a corporation of Delaware Application March 7, 1947, Serial No. 733,177

2 Claims. (Cl. 202—42)

This invention relates to a process of azeotropic distillation to prepare pure hydrocarbons from hydrocarbon mixtures which are difficult to separate by ordinary fractional distillation due to the small differences of boiling points of the individual hydrocarbons in the mixture and relates more specifically to the purification of dimethylbutadiene by such a process.

Continuous azeotropic purification consists essentially in distilling the product to be purified in the presence of an entraining agent which forms an azeotrope with the product to be purified, the boiling point of which is different from that of either the impurities or the pure product itself. The azeotrope is then treated to remove the entraining agent and redistilled. 2,3-dimethylbutadiene-1,3 is a valuable component in manufacturing rubber substitutes and therefore must be produced in high purity, since the impurities, chief among which is methylpentadiene, are very undesirable. Pure dimethylbutadiene boils at 68.9° C. while pure methyl pentadiene boils at 70.0° C. Because of the closeness of the boiling points of these two compounds, it is very difficult to effect an efficient separation, solely by distillation.

It has now been found that methanol forms an azeotrope with dimethylbutadiene which boils at 52° C. The composition of this azeotrope is approximately 25% methanol and 75% dimethylbutadiene. Since methanol is soluble in water, it is easily removed from the azeotrope by the simple expedient of washing the azeotrope with water. Upon redistillation substantially pure dimethylbutadiene is obtained.

For a further understanding of the invention, reference may be had to the accompanying drawing in which the single figure is an elevational view, showing an apparatus embodying the improvements of the present invention.

Referring, therefore, to the drawing, an impure 2,3-dimethylbutadiene-1,3 fraction together with 25% by volume of methanol based on the dimethylbutadiene is introduced through line 1 into the bottom of distillation tower 2. Distillation tower 2 is heated (by means not shown) so as to take overhead through line 3 an azeotrope having the composition 75% dimethylbutadiene and 25% methyl alcohol and boiling between 50° and 53° C. The overhead fraction is passed into the bottom of tower 4 where it is passed countercurrent to a stream of water introduced through line 5. The water removes the methanol from the dimethyl butadiene stream and is removed from the bottom of tower 4 through line 6. Dimethylbutadiene free from methanol, but still containing about 10% impurities is removed from tower 4 through line 7 and passed to distillation tower 8 where it is redistilled and a 68–70° C. fraction is taken off overhead through line 9. This redistilled fraction contains less than 5% impurities.

The following example illustrates one means of carrying this invention into practice.

Example

A fraction containing 50% dimethylbutadiene and 50% methyl pentadienes was obtained in distilling dimethylbutadiene prepared by the olefin-formaldehyde condensation. This represented material boiling at about 70–77° C. To test purification through the methanol azeotrope, 1200 ml. of the 50% dimethylbutadiene cut and 200 ml. methanol were mixed and distilled. The azeotrope was collected at 50–53° C. and amounted to 800 ml., which would be expected since the azeotrope is 25% $CH_3OH$ and 75% dimethylbutadiene.

The azeotrope showed R. I.=1.4092; $d(20/4)$ = 0.7454. After washing 500 ml. of azeotrope with 3×100% of $H_2O$, 350 ml. of hydrocarbon were recovered showing R. I.=1.4420; $d(20/4)$ =0.7346. It showed by infra-red analysis:

| | Per cent |
|---|---|
| Dimethylbutadiene | 80 |
| Me pentadienes | 10 |

Of this material, 250 ml. were redistilled, and 70% collected at 155–159° F. showing R. I.= 1.4392; $d(20/4)$ =0.7266; infra-red analysis gave 90% dimethylbutadiene, 5% methyl pentadienes.

The intra-red analysis is not extremely precise, and may be in error by 10%. Since pure dimethylbutadiene has R. I.=1.4394; $d(20/4)$ = 0.7261, it appears that the final product is almost 100% dimethylbutadiene.

When the same mixture of 50% dimethylbutadiene and methylpentadiene was subjected to ordinary distillation in the absence of methanol a condensate was obtained which boiled between 68° and 70° C. and contained 30% methyl pentadiene. When this product was redistilled the fraction boiling between 68 and 70° C. still contained 15% impurities.

From the above data it is evident that even with two distillations, dimethylbutadiene cannot be freed from impurities while after one distillation with methanol as the entrainer a product containing only 10% impurities was obtained which were practically completely removed by a second distillation.

The nature and objects of the present invention having been thus described and illustrated, what is claimed as new and useful and is desired to be secured by Letters Patent is:

1. A process for separating 2,3-dimethylbutadiene from its mixtures with methyl pentadiene which comprises adding methanol to the mixture of dimethylbutadiene and methyl pentadiene and distilling the resulting mixture to separate the dimethyl butadiene as an azeotrope with the methanol.

2. A process for separating 2,3-dimethyl butadiene-1.3 from methyl pentadiene which comprises distilling the dimethylbutadiene-methyl pentadiene mixture with methanol to separate dimethyl butadiene as an azeotrope, washing with water to remove the methanol and distilling the methanol-free dimethylbutadiene.

RICHARD C. BRANDON.

REFERENCES CITED

The following references are of record in the file of this patent:

UNITED STATES PATENTS

| Number | Name | Date |
|---|---|---|
| 2,339,560 | De Simo | Jan. 18, 1944 |
| 2,361,493 | Patterson | Oct. 31, 1944 |
| 2,386,375 | Welling | Oct. 9, 1945 |

OTHER REFERENCES

Bureau of Standards Journal of Research, vol. 21, pp. 44–52, 56, 57 (July 1941). (Copy in Division 25.)